United States Patent
Hu et al.

(10) Patent No.: US 11,891,155 B2
(45) Date of Patent: Feb. 6, 2024

(54) BICYCLE FRONT DERAILLEUR

(71) Applicant: AD-II Engineering Inc., Taichung (TW)

(72) Inventors: Kai-Hung Hu, Taichung (TW); Yu-Hsuan Cheng, Taichung (TW)

(73) Assignee: AD-II ENGINEERING INC., Taichung (TW)

( * ) Notice: Subject to any disclaimer, the term of this patent is extended or adjusted under 35 U.S.C. 154(b) by 0 days.

(21) Appl. No.: 18/159,239

(22) Filed: Jan. 25, 2023

(65) Prior Publication Data

US 2023/0234674 A1 Jul. 27, 2023

(30) Foreign Application Priority Data

Jan. 27, 2022 (TW) .................................. 111103541

(51) Int. Cl.
| | |
|---|---|
| *B62M 9/1342* | (2010.01) |
| *B62M 9/1344* | (2010.01) |
| *B62M 9/136* | (2010.01) |

(52) U.S. Cl.
CPC .......... *B62M 9/1342* (2013.01); *B62M 9/136* (2013.01); *B62M 9/1344* (2013.01)

(58) Field of Classification Search
CPC ...... B62M 25/02; B62M 9/127; B62M 9/137; B62M 9/1244; Y10T 74/2045
USPC ..................................................... 474/80, 82
See application file for complete search history.

(56) References Cited

U.S. PATENT DOCUMENTS

| | | | | |
|---|---|---|---|---|
| 3,927,904 A * | 12/1975 | Bergles | ................ | B62M 9/1242 474/82 |
| 4,030,374 A * | 6/1977 | Isobe | ................... | B62M 9/1348 474/82 |
| 4,132,119 A * | 1/1979 | Nagano | ................ | B62M 9/1244 474/82 |
| 4,183,255 A * | 1/1980 | Leiter | .................. | B62M 9/1246 474/82 |
| 4,194,409 A * | 3/1980 | Nagano | .................. | B62M 9/136 474/80 |
| 4,198,873 A * | 4/1980 | Nagano | ..................... | G05G 7/02 474/82 |
| 4,237,743 A * | 12/1980 | Nagano | .................. | B62M 9/135 474/140 |
| 4,241,617 A * | 12/1980 | Nagano | .................. | B62M 25/02 474/82 |
| 4,259,873 A * | 4/1981 | Nagano | ................ | B62M 9/1248 474/82 |
| 4,424,048 A * | 1/1984 | Shimano | ................ | B62M 9/137 474/82 |

(Continued)

*Primary Examiner* — Henry Y Liu
(74) *Attorney, Agent, or Firm* — Muncy, Geissler, Olds & Lowe, P.C.

(57) ABSTRACT

A bicycle front derailleur is provided, including: a base, configured to be mounted to a bicycle frame; a linkage mechanism, including a connection portion configured to be connected with a cable, the linkage mechanism being swingably connected to the base; a chain guide, swingably connected to the linkage mechanism; and an adjustment assembly, disposed on the base, including a holder movably disposed on the base and an adjustment member, the holder being configured to be connected with a sheath for driving the cable, the adjustment member being movably disposed on the base and adjustable to drive the holder to move relative to the base.

10 Claims, 10 Drawing Sheets

(56) References Cited

U.S. PATENT DOCUMENTS

| | | | | |
|---|---|---|---|---|
| 4,452,593 A * | 6/1984 | Coue | B62M 9/1242 | 414/917 |
| 4,573,951 A * | 3/1986 | Nagano | B62M 9/127 | 474/82 |
| 4,617,006 A * | 10/1986 | Nagano | B62M 9/1342 | 474/82 |
| 4,833,937 A * | 5/1989 | Nagano | B62M 9/127 | 474/82 |
| 5,456,637 A * | 10/1995 | Chang | B62M 9/1244 | 474/78 |
| 5,518,456 A * | 5/1996 | Kojima | B62M 9/1248 | 474/82 |
| 5,607,367 A * | 3/1997 | Patterson | B62M 9/134 | 474/80 |
| 5,624,334 A * | 4/1997 | Lumpkin | B62M 25/02 | 474/79 |
| 5,630,338 A * | 5/1997 | Patterson | F16C 1/22 | 74/501.5 R |
| 5,765,446 A * | 6/1998 | Patterson | F16C 1/22 | 74/501.5 R |
| 5,809,840 A * | 9/1998 | Oda | B62J 11/13 | 74/501.5 R |
| 5,865,698 A * | 2/1999 | Huang | B62M 9/1246 | 474/82 |
| 5,961,409 A * | 10/1999 | Ando | B62M 9/1244 | 474/82 |
| RE36,830 E * | 8/2000 | Lumpkin | B62M 25/02 | 474/79 |
| 6,099,425 A * | 8/2000 | Kondo | B62M 9/137 | 474/82 |
| 6,135,905 A * | 10/2000 | Soon | B62M 9/00 | 180/231 |
| 6,350,212 B1 * | 2/2002 | Campagnolo | B62M 9/126 | 474/82 |
| 6,405,613 B1 * | 6/2002 | Lim | F16C 1/262 | 74/501.5 R |
| 6,419,602 B1 * | 7/2002 | Soon | B62M 9/00 | 474/80 |
| 8,100,032 B2 * | 1/2012 | Boehm | B60T 11/046 | 74/489 |
| 9,616,970 B2 * | 4/2017 | Kuwayama | B62M 9/1342 | |
| 9,623,932 B2 * | 4/2017 | Watarai | B62M 9/124 | |
| 10,065,705 B2 * | 9/2018 | Kuwayama | B62M 9/1342 | |
| 2003/0166427 A1 * | 9/2003 | Dillon | B62M 9/127 | 474/82 |
| 2004/0171446 A1 * | 9/2004 | Nanko | B62M 9/137 | 474/81 |
| 2005/0192141 A1 * | 9/2005 | Onogi | B62M 9/126 | 474/82 |
| 2006/0058135 A1 * | 3/2006 | Shahana | B62M 9/125 | 474/82 |
| 2007/0117666 A1 * | 5/2007 | Ichida | B62M 9/135 | 474/80 |
| 2008/0125258 A1 * | 5/2008 | Oseto | B62M 9/1244 | 474/80 |
| 2008/0153639 A1 * | 6/2008 | Tan | B62M 9/127 | 474/80 |
| 2008/0300076 A1 * | 12/2008 | Fukushima | B62M 9/1344 | 474/80 |
| 2013/0079184 A1 * | 3/2013 | Yamaguchi | B62M 9/1248 | 474/80 |
| 2013/0085026 A1 * | 4/2013 | Kuwayama | B62M 9/131 | 474/80 |
| 2014/0349793 A1 * | 11/2014 | Emura | B62M 9/134 | 474/80 |
| 2015/0018145 A1 * | 1/2015 | Emura | B62M 9/1342 | 474/80 |
| 2016/0068225 A1 * | 3/2016 | Kuwayama | B62M 9/137 | 474/80 |
| 2016/0121967 A1 * | 5/2016 | Nishino | B62M 9/1342 | 474/80 |
| 2016/0167739 A1 * | 6/2016 | Watarai | B62M 9/124 | 474/80 |
| 2016/0229488 A1 * | 8/2016 | Kuwayama | B62M 9/1342 | |

* cited by examiner

BICYCLE FRONT DERAILLEUR

BACKGROUND OF THE INVENTION

Field of the Invention

The present invention relates to a bicycle front derailleur.

Description of the Prior Art

The bicycle front derailleur is pulled by the pulling force of the cable of a shift mechanism to drive the chain guide to move toward the inside or outside of a bicycle frame to move the chain to achieve the effect of shifting gears. However, if the core of the cable is over-tensioned or insufficiently tensioned, the chain on gears cannot be smoothly shifted.

In the conventional bicycle front derailleur, the cable tension adjustment structure is disposed on the linkage assembly, and the linkage assembly is driven when the cable is pulled so that it results in deflection of the linkage assembly due to a pre-force onto the linkage assembly when the cable is pulled. Furthermore, when adjusting the tension of the cable, the cable will be forced by a limiting structure of the bicycle front derailleur so that the cable is bent and deformed and will be pulled unsmoothly.

The present invention is, therefore, arisen to obviate or at least mitigate the above-mentioned disadvantages.

SUMMARY OF THE INVENTION

The main object of the present invention is to provide a bicycle front derailleur which can be adjusted in tension and avoid the deflection of a cable due to a pre-force when the cable is pulled.

To achieve the above and other objects, the present invention provides a bicycle front derailleur is provided, including: a base, configured to be mounted to a bicycle frame; a linkage mechanism, including a connection portion configured to be connected with a cable, the linkage mechanism being swingably connected to the base; a chain guide, swingably connected to the linkage mechanism; and an adjustment assembly, disposed on the base, including a holder movably disposed on the base and an adjustment member, the holder being configured to be connected with a sheath for driving the cable, the adjustment member being movably disposed on the base and adjustable to drive the holder to move relative to the base.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
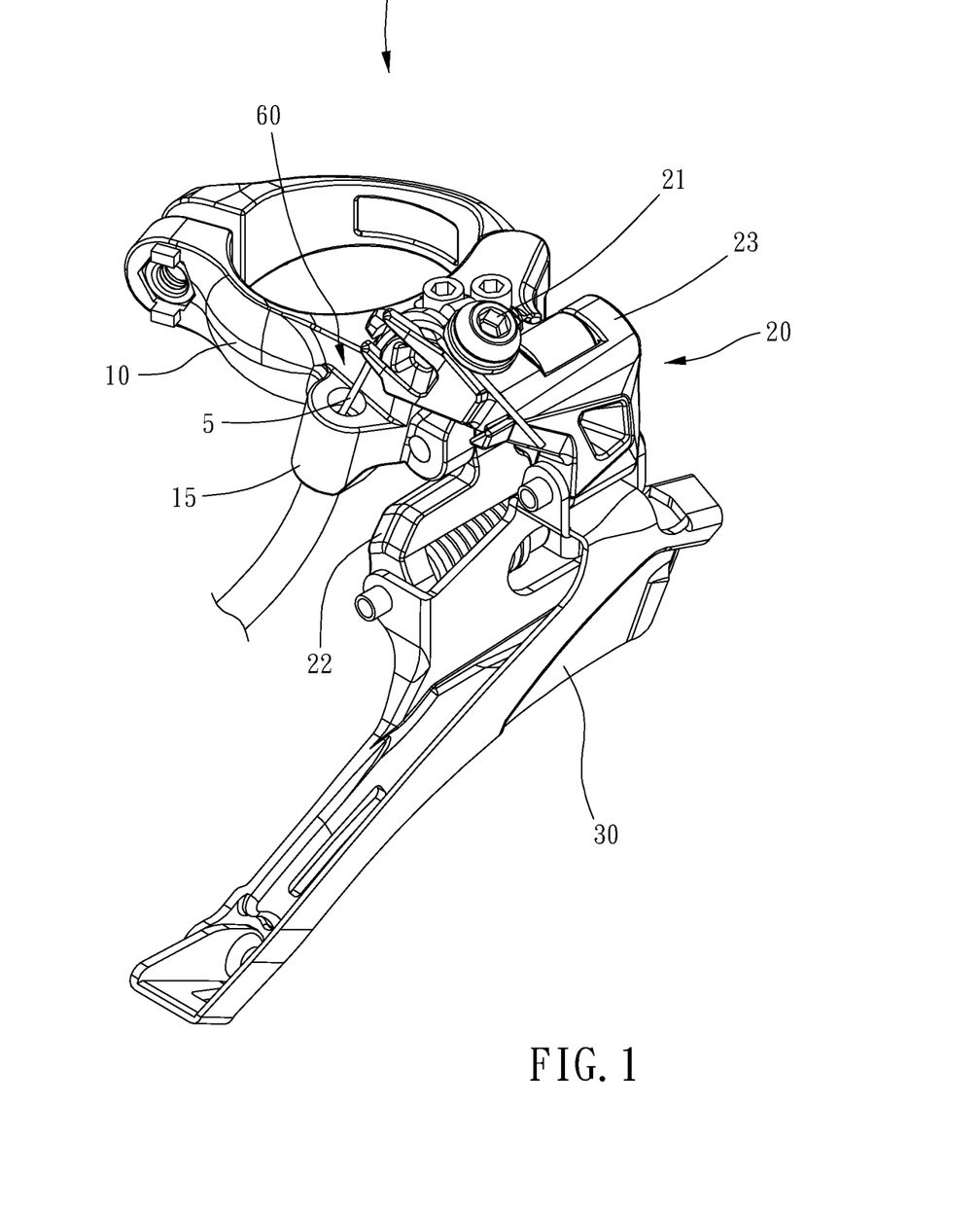
FIG. 1 is a stereogram of a preferable embodiment of the present invention.
Figure 2:
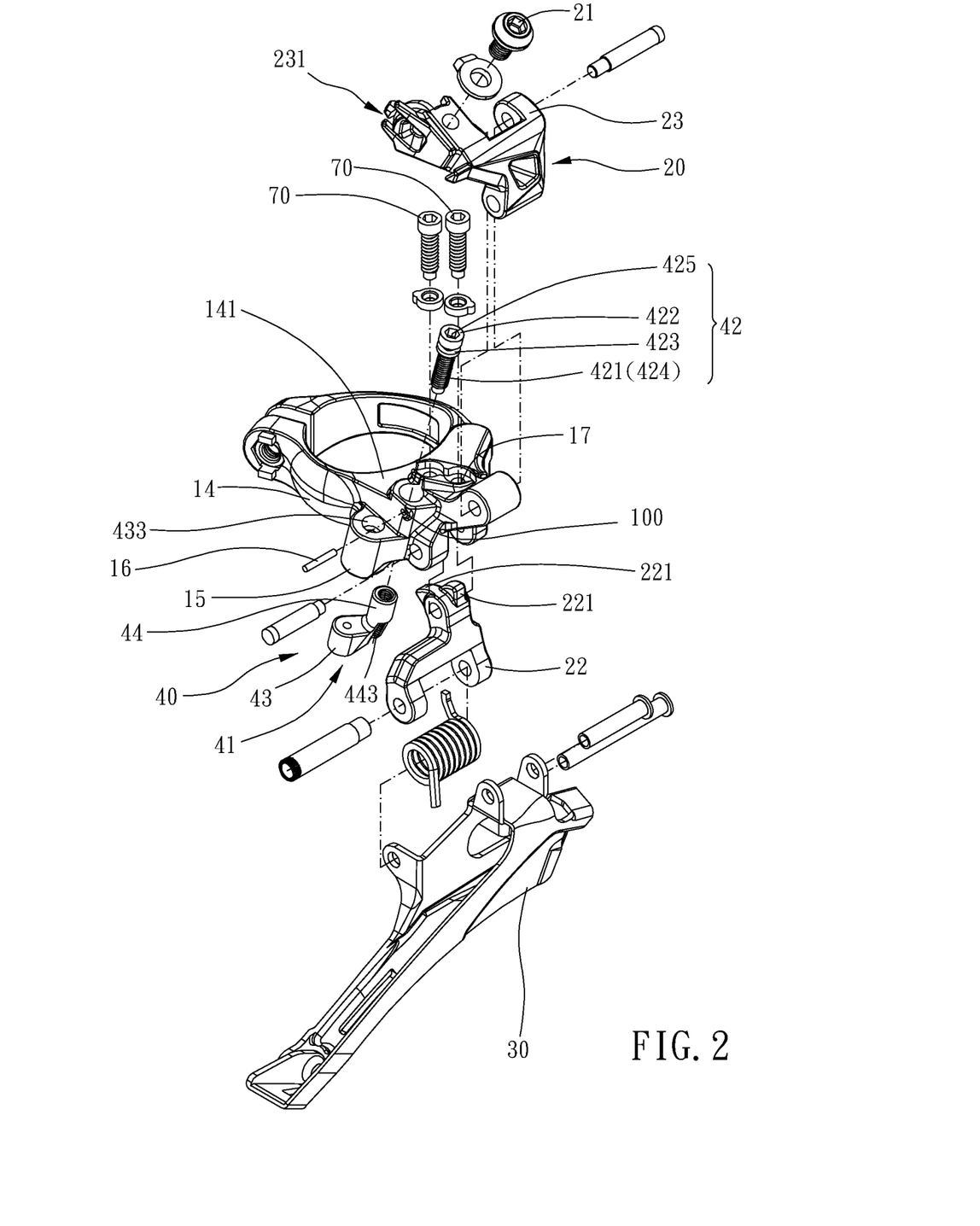
FIG. 2 is a breakdown drawing of a preferable embodiment of the present invention.
Figure 3:
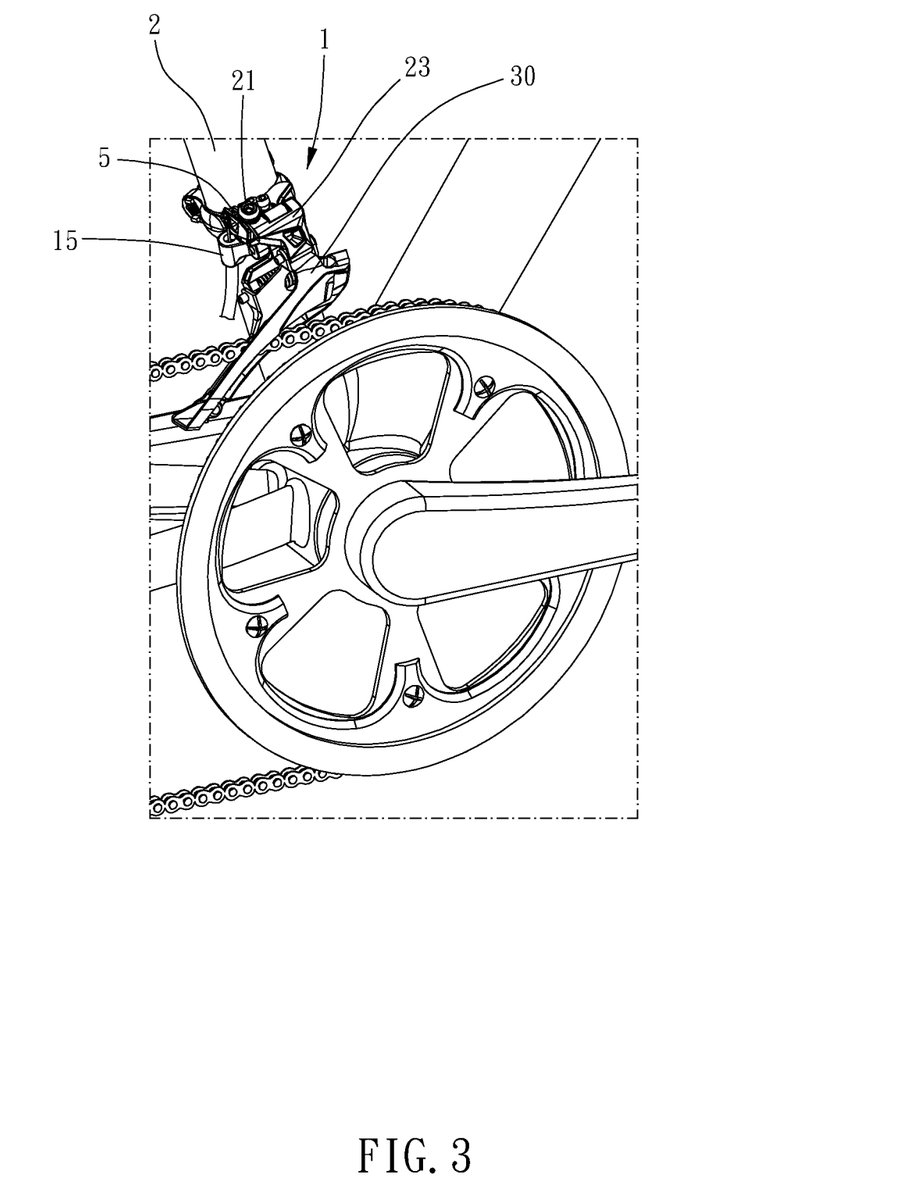
FIG. 3 is a partial enlarged cross-sectional view of a preferable embodiment of the present invention.
Figure 4:
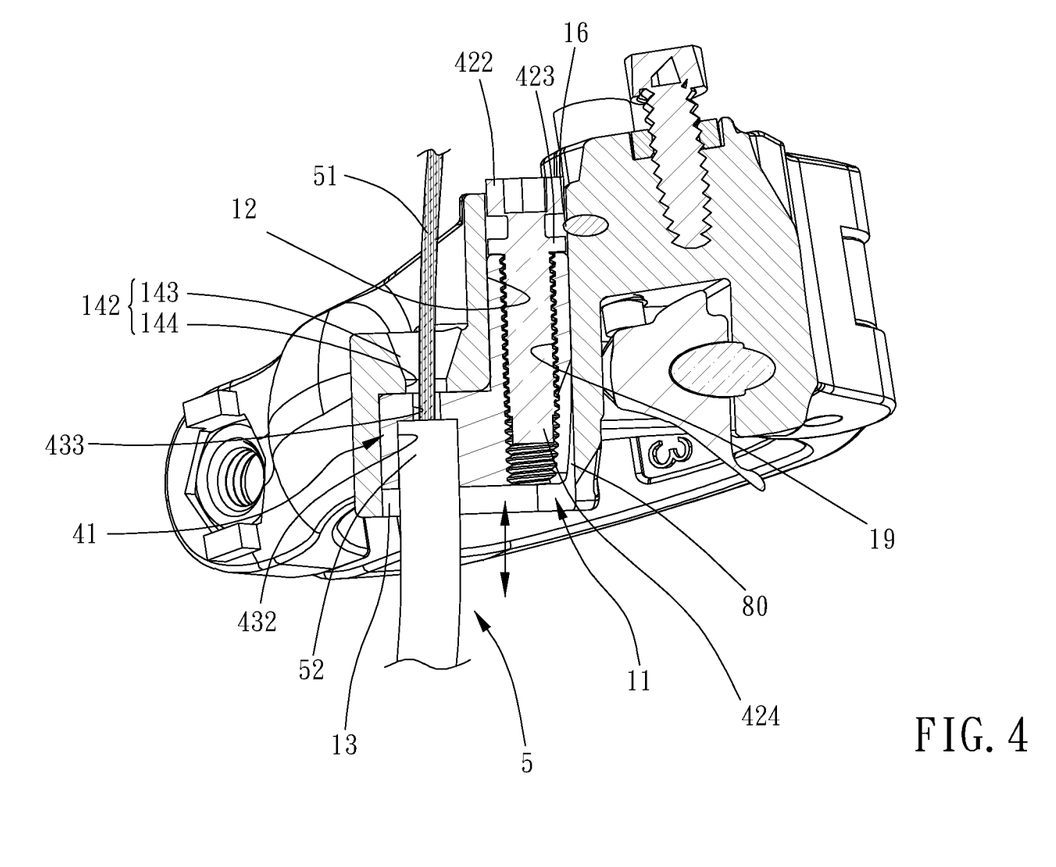
FIG. 4 is a cross-sectional view of a holder in a first position according to a preferable embodiment of the present invention.
Figure 5:
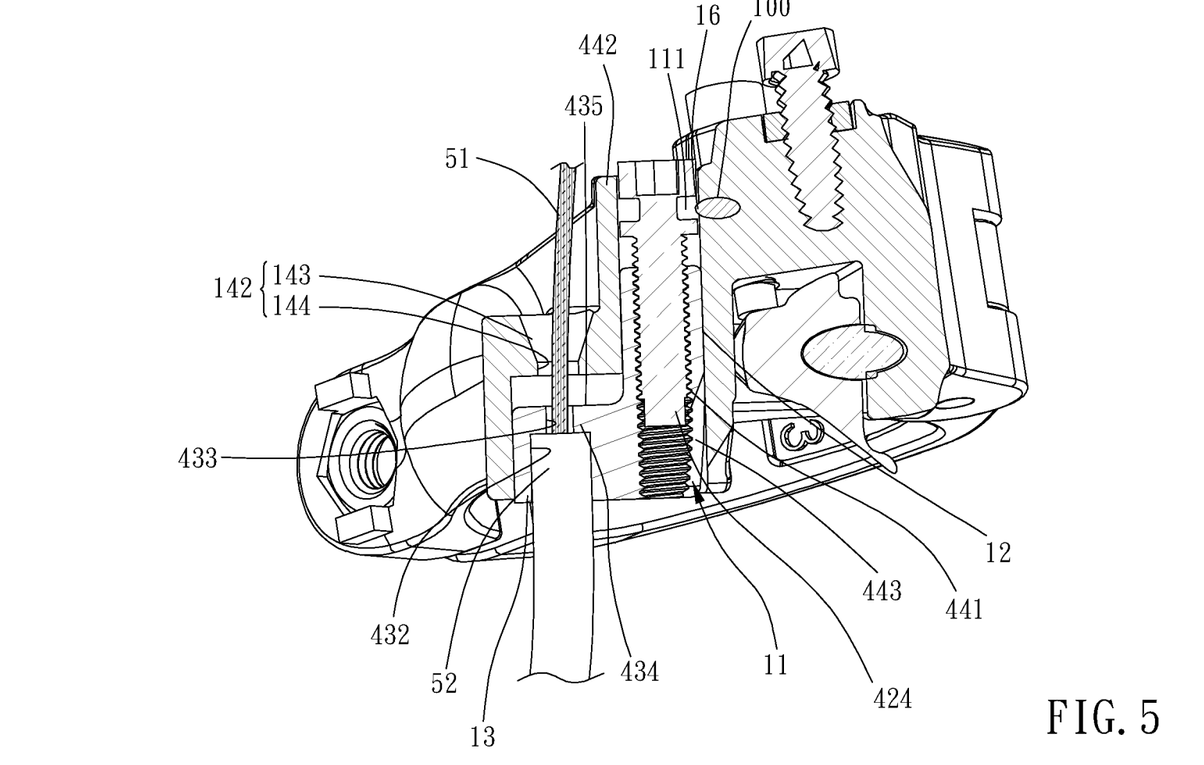
FIG. 5 is a cross-sectional view of the holder in a second position according to a preferable embodiment of the present invention.
Figure 6:
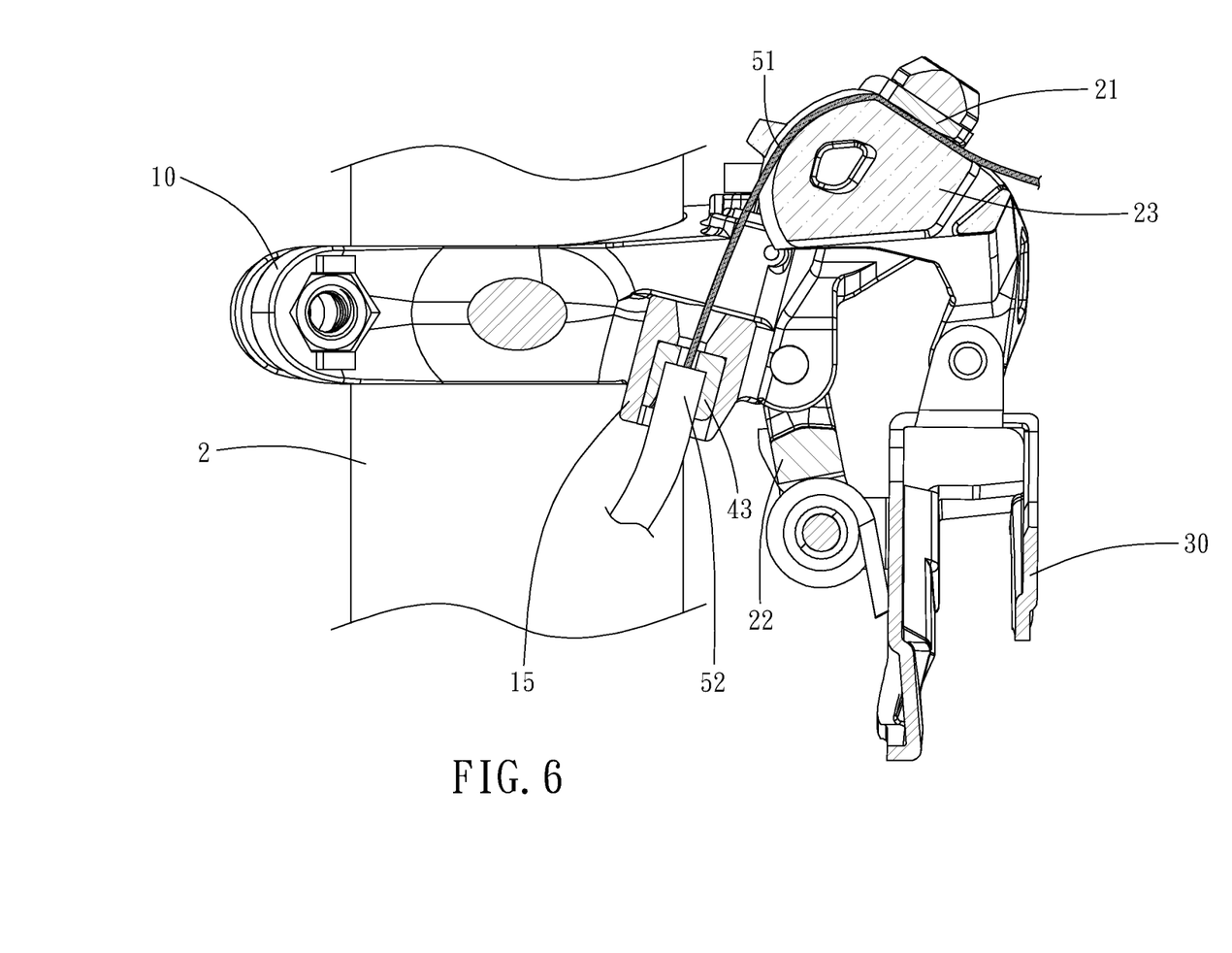
FIG. 6 is another cross-sectional view of the holder in the first position according to a preferable embodiment of the present invention.
Figure 7:
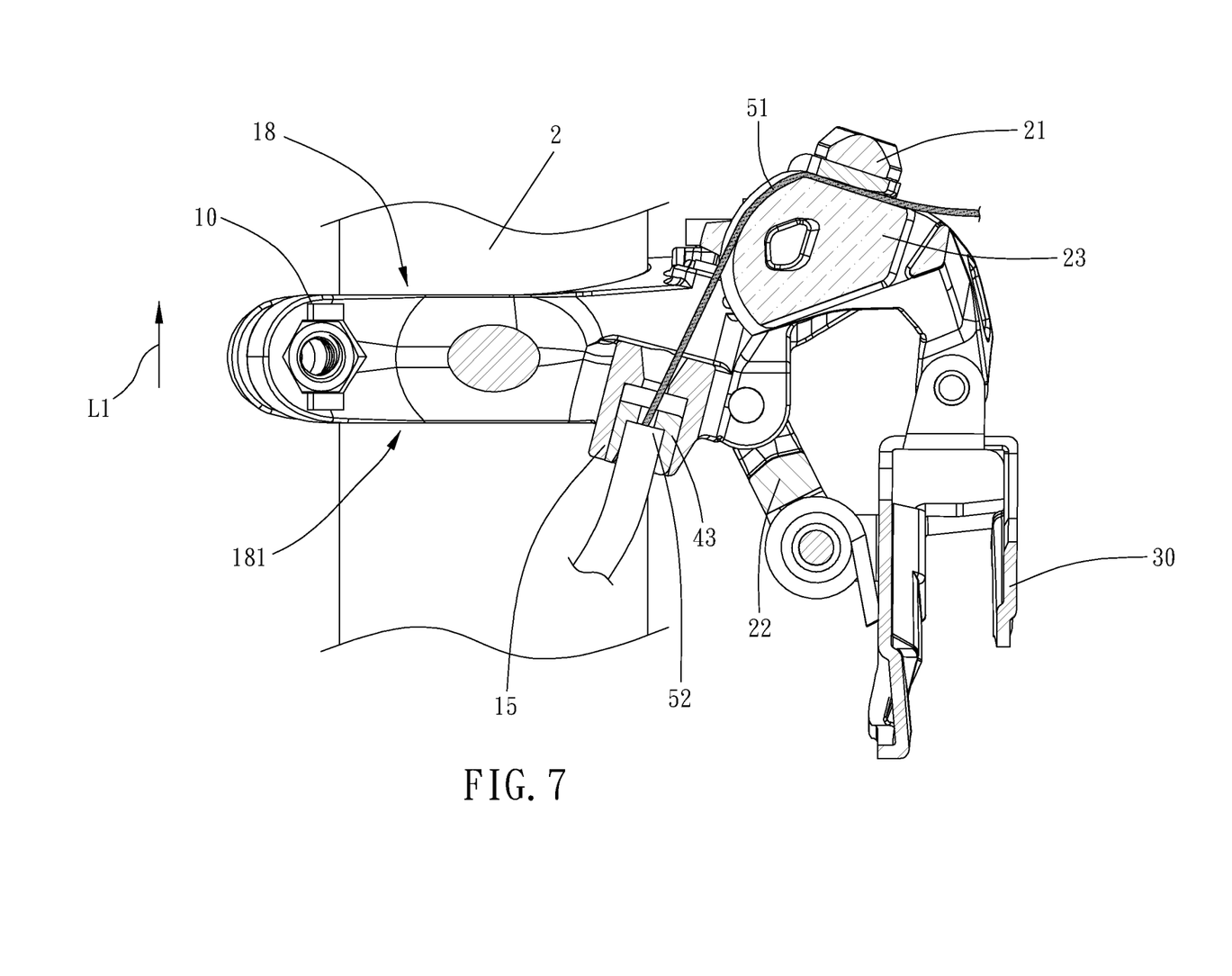
FIG. 7 is another cross-sectional view of the holder in the second position according to a preferable embodiment of the present invention.
Figure 8:
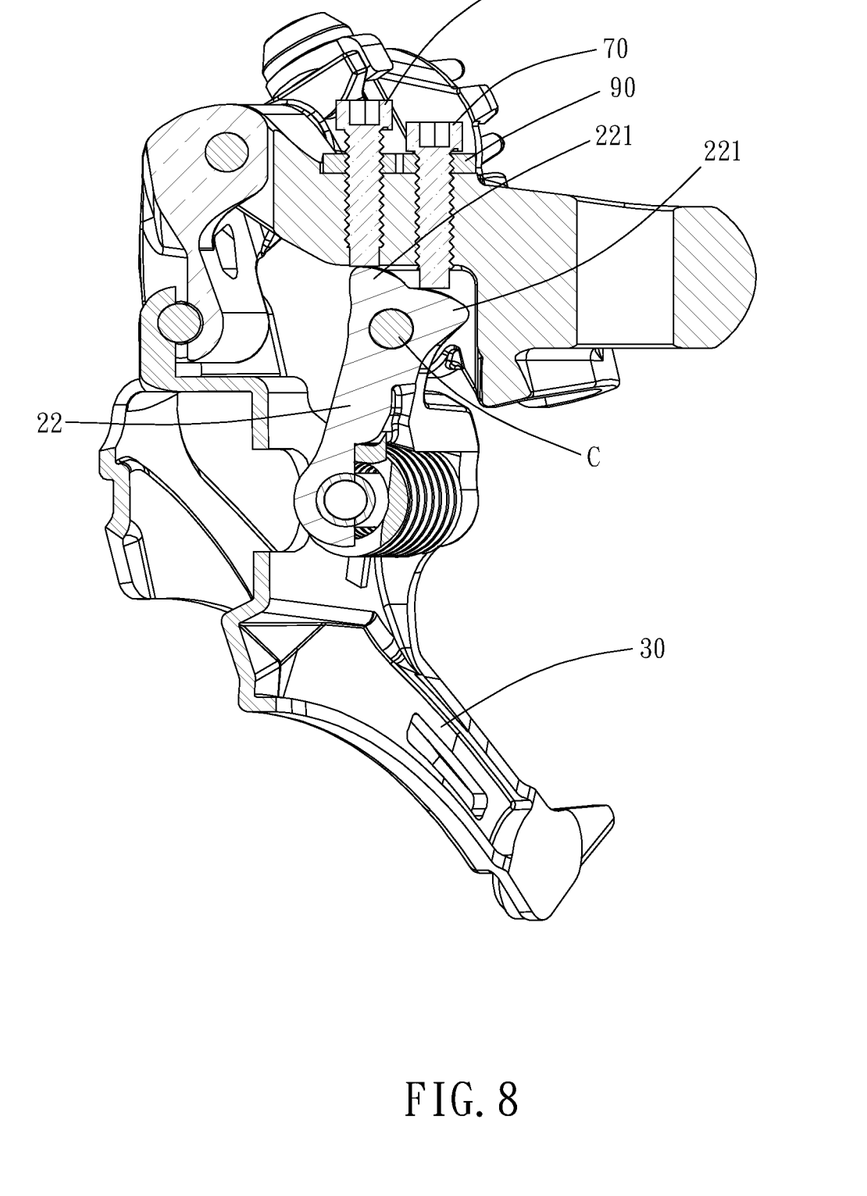
FIG. 8 is a cross-sectional view of a chain guide in a first position according to a preferable embodiment of the present invention.
Figure 9:
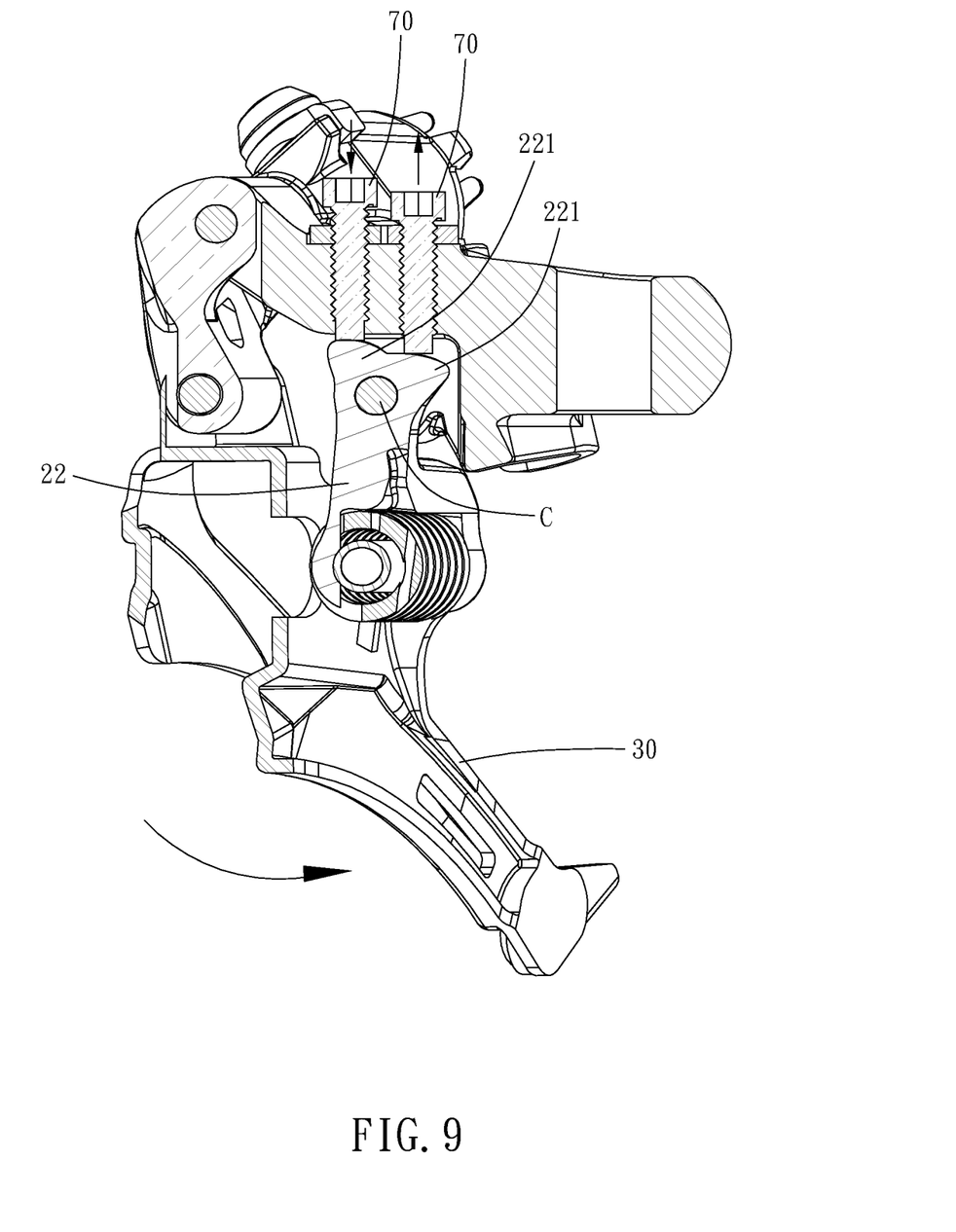
FIG. 9 is a cross-sectional view of the chain guide in a second position according to a preferable embodiment of the present invention.
Figure 10:
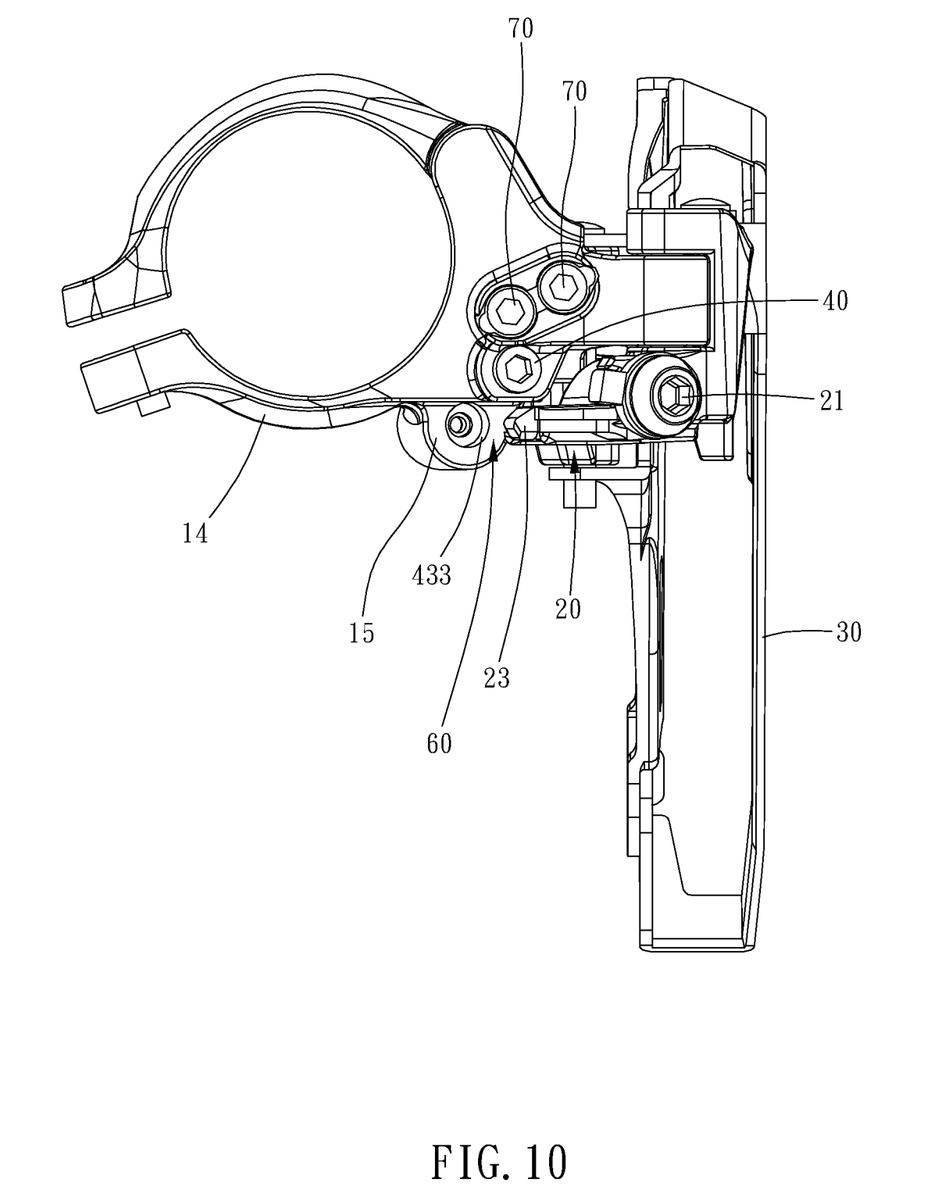
FIG. 10 is a top view of a preferable embodiment of the present invention.

Please refer to FIGS. 1 to 10 for a preferable embodiment of the present invention. A bicycle front derailleur 1 of the present invention includes a base 10, a linkage mechanism 20, a chain guide 30 and an adjustment assembly 40.

The base 10 is configured to be mounted to a bicycle frame 2. The linkage mechanism 20 includes a connection portion 231, the connection portion 231 is configured to be connected with a cable 5, and the linkage mechanism 20 swingably connected to the base 10. The cable 5 can be pulled by operating a shift mechanism. The chain guide 30 is swingably connected to the linkage mechanism 20. The adjustment assembly 40 is disposed on the base 10, the adjustment assembly 40 includes a holder 41 movably disposed on the base 10 and an adjustment member 42, and the holder 41 is configured to be connected with a sheath 52 for driving the cable 5 by clamping, restricting, holding or the like. The adjustment member 42 is movably disposed on the base 10 and adjustable to drive the holder 41 to move relative to the base 10. Whereby, the tension of the cable 5 can be adjusted, and the linkage mechanism 20 will not deflect due to the pre-force when the cable 5 is pulled.

The linkage mechanism 20 includes a fixing member 21 (such as a screw), the fixing member 21 is configured to affix the cable 5, the cable 5 extends in an extension direction, the holder 41 is movable relative to the base 10 in the extension direction, so that When the tension of the cable 5 is adjusted by adjusting the movement of the holder 41, the cable 5 can be kept free from force bending and deformation on the extension direction during adjustment.

The adjustment member 42 includes an operation portion 422 configured to be connected with a tool (such as wrench). In this embodiment, the operation portion 422 includes an assembling hole 425 configured to be assembled with the tool. Specifically, the holder 41 includes a holding portion 43 and an adjustment portion 44 connected to the holding portion 43. In this embodiment, the holding portion 43 and the adjustment portion 44 are integrally formed of one piece, the holding portion 43 is configured to be connected with the sheath 52, the adjustment member 42 is disposed through the base 10, one of the adjustment portion 44 and the adjustment member 42 includes a threaded hole 441, and the other of the adjustment portion 44 and the adjustment member 42 includes a threaded rod 424 screwed in the threaded hole 441. In this embodiment, the adjustment portion 44 includes the threaded hole 441, and the adjustment member 42 includes the threaded rod 424.

In operation, the tool is assembled to the assembling hole 425 to drive the adjustment member 42 to rotate so that the holder 41 is moved relative to the adjustment member 42 to achieve tension adjustment/fine-tuning. The base 10 includes a guide groove 11, and the holder 41 corresponds to the guide groove 11 and movably is movably received in the guide groove 11. The holder 41 is movable relative to the guide groove 11 linearly so that the holder 41 can move stably in the guide groove 11. The guide groove 11 may be L-shaped, the guide groove 11 includes a long section 12 and a short section 13 in communication with the long section 12, the holder 41 is L-shaped, the adjustment portion 44 is received in the long section 12, the holding portion 43 is received in the short section 13, the holding portion 43 is laterally protrusive beyond the adjustment portion 44. As such, the structure is simple, the moving path of the holder 41 can be adjusted, and the holder 41 can be stably supported, adjusted and restricted.

The holding portion 43 includes an opening 433 and a flange 434 extending radially, the opening 433 is configured for a core 51 of the cable 5 to disposed therethrough, and the flange 434 is configured to be butted against the sheath 52 which is disposed around the core 51 in a direction in which the cable 5 extends. As such, the sheath 52 can be driven to move and limit the cable 5. In other embodiments, the holding portion may be positioned in other ways such as clamping, and the cable can also include only the core without the sheath 52. Preferably, the holding portion 43 includes a receiving hole 432 in communication with the opening 433, and the receiving hole 432 is configured to receive the cable 5.

A first upper portion 442 of the adjustment portion 44 is higher than a second upper portion 435 of the holding portion 43, the adjustment member 42 is disposed through the first upper portion 442, and the second upper portion 435 includes the opening 433. The bicycle front derailleur 1 further includes a dodge space 60, the dodge space 60 is disposed on the base 10 or the holder 41, and the dodge space 60 is located between the adjustment portion 44 and the connection portion 231. In this embodiment, the dodge space 60 is disposed on the base 10, the linkage mechanism 20 is at least partially movable within the dodge space 60, and the opening 433 is open toward the dodge space 60. Specifically, the base 10 includes a base portion 14 and a projection 15 projecting from the base portion 14, the projection 15 is lower than a top surface 141 of the base portion 14, the linkage mechanism 20 is swingably connected to the base 10, the long section 12 is disposed on the base portion 14, the short section 13 is disposed on the projection 15, and the base portion 14 and the projection 15 form the dodge space 60 therebetween. Preferably, the base 10 defines a top side 18 and a bottom side 181 opposite to the top side 18, and the relative terms "the top side" and "the bottom side" are here defined based on the condition when the base 10 is mounted on the bicycle frame 2. The base 10 defines a first direction L1 from the bottom side 181 to the top side 18, the opening 433 is open in the first direction L1, the base 10 includes a through hole 19 open in the first direction L1, the through hole 19 corresponds to the first upper portion 442, the adjustment member 42 is disposed through the through hole 19, and the linkage mechanism 20 is connected to a side portion of the base 10. As such, when adjusting the adjustment member 42, it will not be interfered by the linkage mechanism 20, and the adjustment can be directly observed from above to facilitate observation of the tension and tightness of the cable 5 during adjustment, and the swinging range of the linkage mechanism 20 can also be directly observed.

The base portion 14 includes a perforation 142 corresponding to and in communication with the opening 433, the perforation 142 includes a large diameter section 143 and a small diameter section 144 in communication with the large diameter section 143, the small diameter section 144 is located between the large diameter section 143 and the opening 433, and the large diameter section 143 and the small diameter section 144 are configured for the core 51 to disposed therethrough. Respective inner diametric dimensions of the large diameter section 143, the small diameter section 144 and the receiving hole 432 are larger than a diametric dimension of the opening 433, so that the core 51 is movable for a wide range, and the tension of the core 51 can be adjusted smoothly.

The adjustment portion 44 includes a cut portion 443. In this embodiment, a gap 80 is formed between the cut portion 443 and an inner circumferential wall of the long section 12, which reduces the contact area and facilitates smooth movement.

The adjustment member 42 further includes a body portion 421 and a blocking portion 423, the base 10 further includes a limitation slot 100, a limitation member 16 is received within the limitation slot 100, and the limitation member 16 and the blocking portion 423 are blocked with each other. Specifically, the limitation member 16 and the blocking portion 423 are blocked with each other in a direction in which the adjustment member 42 moves. The blocking portion 423 is located between the operation portion 422 and the body portion 421, there is a space 111 between the limitation slot 100 and the guide groove 11, and the blocking portion 423 projects within the space 111. In this embodiment, the body portion 421 includes the threaded rod 424 so that the relative displacement of the holder 41 is adjusted by turning the adjustment member 42.

The bicycle front derailleur 1 further includes two screws 70 and two washers 90. The linkage mechanism 20 includes an inner linkage member 22 and an outer linkage member 23, and the inner linkage member 22 and the outer linkage member 23 are swingably connected to the base 10 and the chain guide 30, respectively. The inner linkage member 22 is rotatable about a shaft C and swingable relative to the base 10. The inner linkage member 22 includes two salients 221, and the two salients 221 project laterally from opposing sides of the shaft C and are offset in a direction along the shaft C. The base 10 further includes two threaded holes 17, each of the two screws 70 is screwed within one of the two threaded holes 17 and detachably abutted against one of the two salients 221, and the two screws 70 are arranged in parallel. Each of the two washers 90 is interposed between one of the two screws 70 and the inner linkage member 22 so that the chain guide 30 can be adjusted toward the inner side of the bicycle frame 2 or away from the outer side of the bicycle frame 2, and the two screws 70 can be positioned diagonally to achieve screw adjustment and stable positioning of the inner linkage member 22. Specifically, the two screws 70 can be adjusted respectively to move away from or close to the two salients 221 so that the inner linkage member 22 swings outwards or inwards relative to the base 10 to drive the chain guide 30.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle front derailleur, including:
a base, configured to be mounted to a bicycle frame;
a linkage mechanism, including a connection portion configured to be connected with a cable, the linkage mechanism being swingably connected to the base;
a chain guide, swingably connected to the linkage mechanism; and
an adjustment assembly, disposed on the base, including a holder movably disposed on the base and an adjustment member, the holder being configured to be connected with a sheath for driving the cable, the adjustment member being movably disposed on the base and adjustable to drive the holder to move relative to the base.

2. The bicycle front derailleur of claim 1, wherein the adjustment member includes an operation portion configured to be connected with a tool.

3. The bicycle front derailleur of claim 1, wherein the base includes a guide groove, and the holder corresponds to the guide groove and is movably received in the guide groove.

4. The bicycle front derailleur of claim 3, wherein the holder is movable relative to the guide groove linearly.

5. The bicycle front derailleur of claim 1, wherein the adjustment member further includes a body portion and a blocking portion.

6. The bicycle front derailleur of claim 5, wherein the base includes a limitation slot, a limitation member is received within the limitation slot, and the limitation member and the blocking portion are blocked with each other.

7. The bicycle front derailleur of claim 6, wherein the adjustment member includes an operation portion, the base includes a guide groove, the blocking portion is located between the operation portion and the body portion, there is a space between the limitation slot and the guide groove, and the blocking portion projects within the space.

8. The bicycle front derailleur of claim 1, wherein the holder includes an opening and a flange extending radially, the opening is configured for a core of the cable to disposed therethrough, and the flange is configured to be butted against the sheath which is disposed around the core in a direction in which the cable extends.

9. The bicycle front derailleur of claim 8, wherein the holder includes a holding portion, the holding portion includes a receiving hole in communication with the opening, and the receiving hole is configured to receive the cable.

10. The bicycle front derailleur of claim 1, wherein the holder includes a holding portion and an adjustment portion connected to the holding portion, the holding portion is configured to be connected with the sheath, the adjustment member is disposed through the base, one of the adjustment portion and the adjustment member includes a threaded hole, and the other of the adjustment portion and the adjustment member includes a threaded rod screwed in the threaded hole.

* * * * *